(12) United States Patent
Jones et al.

(10) Patent No.: US 10,697,130 B2
(45) Date of Patent: Jun. 30, 2020

(54) MODULAR FLOORING TILES AND SYSTEM

(71) Applicant: Signature Systems Group, LLC, Flower Mound, TX (US)

(72) Inventors: Chad H Jones, Frisco, TX (US); Marcos Gonzalez, North Richland Hills, TX (US)

(73) Assignee: Signature Systems Group LLC, Flower Mound, TX (US)

( * ) Notice: Subject to any disclaimer, the term of this patent is extended or adjusted under 35 U.S.C. 154(b) by 0 days.

(21) Appl. No.: 16/241,487

(22) Filed: Jan. 7, 2019

(65) Prior Publication Data

US 2019/0211514 A1 Jul. 11, 2019

Related U.S. Application Data

(60) Provisional application No. 62/615,076, filed on Jan. 9, 2018.

(51) Int. Cl.
*E01C 5/00* (2006.01)
*E01C 9/08* (2006.01)
(Continued)

(52) U.S. Cl.
CPC .............. *E01C 9/086* (2013.01); *E01C 5/001* (2013.01); *E01C 5/003* (2013.01); *E01C 5/005* (2013.01); *E01C 5/20* (2013.01); *E01C 11/222* (2013.01); *H02G 9/025* (2013.01); *E01C 2201/12* (2013.01); *E01C 2201/14* (2013.01); *E04F 15/02005* (2013.01); *E04F 15/02172* (2013.01);
(Continued)

(58) Field of Classification Search
CPC .......... E01C 5/001; E01C 5/003; E01C 5/005; E01C 5/20; E01C 9/025; E01C 9/086; E01C 11/222; E01C 2201/12; E01C 2201/14; H02G 9/025; E04F 15/02005; E04F 15/02172; E04F 15/02183
USPC ......... 404/34–36, 41, 43, 72; 52/177, 588.4, 52/588.1
See application file for complete search history.

(56) References Cited

U.S. PATENT DOCUMENTS 4,198,795 A * 4/1980 Barnidge ............. A01K 1/0151
52/180
4,727,697 A * 3/1988 Vaux ........................ E01C 5/18
404/35

(Continued)

*Primary Examiner* — Raymond W Addie
(74) *Attorney, Agent, or Firm* — Metz Lewis Brodman Must O'Keefe LLC

(57) ABSTRACT

Modular floor tiles include a first surface configured to receive weight. The first surface is supported by primary walls interior to and extending the full height of the tiles, and which may be intersecting to form a grid. Secondary walls of a lesser height support the primary walls, may be non-linear such as circular, and may support either side of vertices of intersecting primary walls. Joining members and corresponding receivers in the sides of tiles are dimensioned to engage one another from adjacent tiles to join the tiles and restrict lateral movement. Fastener(s) in each tile are associated with slots and may be selectively moved between unlocked and locked positions to restrict vertical movement. Some embodiments include cable channels with corresponding cover plates, and inclined portions providing ramps. Any number and combination of tiles may be connected to one another to form a modular flooring system.

49 Claims, 13 Drawing Sheets

(51) Int. Cl.
  *E01C 5/20* (2006.01)
  *H02G 9/02* (2006.01)
  *E01C 11/22* (2006.01)
  *E04F 15/10* (2006.01)
  *E04F 15/02* (2006.01)
(52) U.S. Cl.
  CPC ....... *E04F 15/02183* (2013.01); *E04F 15/105* (2013.01)

(56) References Cited

U.S. PATENT DOCUMENTS

| | | | |
|---|---|---|---|
| 5,666,772 A | 9/1997 | Betty | |
| 5,777,266 A | 7/1998 | Herman et al. | |
| 5,787,654 A | 8/1998 | Drost | |
| 5,865,007 A | 2/1999 | Bowman et al. | |
| 5,950,378 A | 9/1999 | Council et al. | |
| D415,471 S | 10/1999 | Henry | |
| 5,992,106 A | 11/1999 | Carling et al. | |
| D437,832 S | 2/2001 | Henry | |
| 6,202,565 B1 | 3/2001 | Henry | |
| 6,481,036 B1 | 11/2002 | Duvall | |
| 6,499,410 B1 | 12/2002 | Berardi | |
| 6,747,212 B1 | 6/2004 | Henry | |
| 6,802,159 B1* | 10/2004 | Kotler | E01C 5/20 404/35 |
| 6,878,881 B1 | 4/2005 | Henry | |
| 7,145,079 B1 | 12/2006 | Henry | |
| 7,300,224 B2* | 11/2007 | Slater | E01C 9/086 404/34 |
| 7,309,836 B2 | 12/2007 | Lubanski | |
| 7,332,672 B2 | 2/2008 | Henry | |
| D563,323 S | 3/2008 | Henry | |
| 7,385,139 B2 | 6/2008 | Lubanski | |
| D583,771 S | 12/2008 | Lubanski | |
| 7,531,746 B2 | 5/2009 | Henry | |
| 7,571,573 B2 | 8/2009 | Moller, Jr. | |
| 7,592,547 B2 | 9/2009 | Lubanski | |
| 7,595,450 B2 | 9/2009 | Lubanski | |
| 7,674,980 B2 | 3/2010 | Lubanski | |
| 7,690,160 B2* | 4/2010 | Moller, Jr. | E04F 15/10 404/35 |
| 7,795,535 B2 | 9/2010 | Lubanski | |
| 7,838,772 B2 | 11/2010 | Lubanski | |
| 7,939,759 B2 | 5/2011 | Henry | |
| 7,943,851 B2 | 5/2011 | Lubanski | |
| 7,950,191 B2* | 5/2011 | Brouwers | E01C 5/20 15/161 |
| 8,119,914 B2 | 2/2012 | Lubanski | |
| 8,288,652 B2 | 10/2012 | Lubanski | |
| 8,309,850 B2 | 11/2012 | Henry | |
| 8,397,466 B2 | 3/2013 | Jenkins et al. | |
| 8,756,882 B1 | 6/2014 | Vachon | |
| 8,791,363 B2 | 7/2014 | Lubanski | |
| D717,284 S | 11/2014 | Kurosawa et al. | |
| 9,059,574 B2 | 6/2015 | Coffman et al. | |
| 9,673,601 B2 | 6/2017 | Coffman et al. | |
| 2004/0005430 A1* | 1/2004 | Rogers | B32B 3/02 428/44 |
| 2008/0313987 A1* | 12/2008 | Ibanez | E04F 15/02016 52/384 |
| 2009/0031658 A1* | 2/2009 | Moller, Jr. | E01C 5/20 52/403.1 |
| 2011/0179734 A1* | 7/2011 | Shaffer | B32B 27/08 52/309.1 |
| 2011/0252730 A1* | 10/2011 | Rosan | E01C 9/086 52/302.1 |
| 2012/0266549 A1* | 10/2012 | Rosan | E01C 9/086 52/173.1 |
| 2013/0037322 A1 | 2/2013 | Lubanski | |
| 2014/0020927 A1 | 1/2014 | Coffman et al. | |

\* cited by examiner

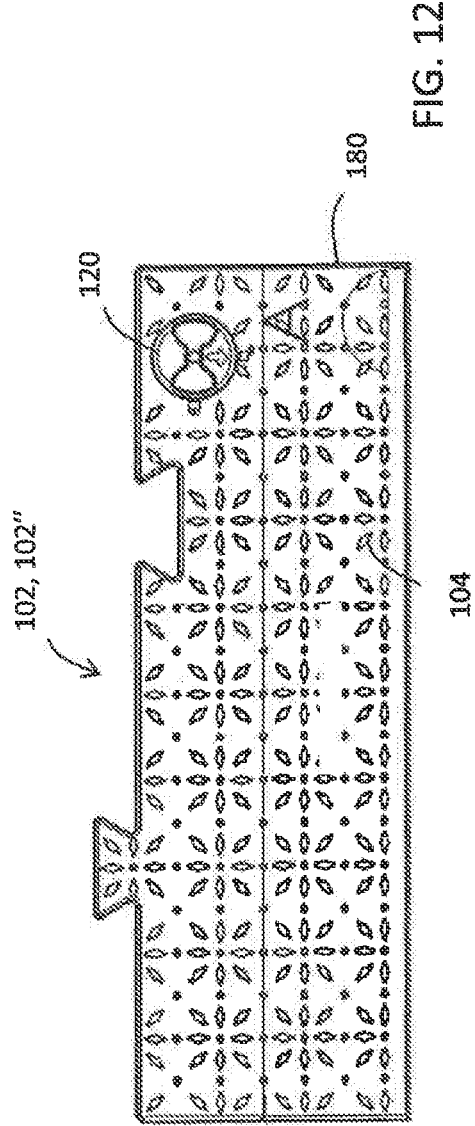
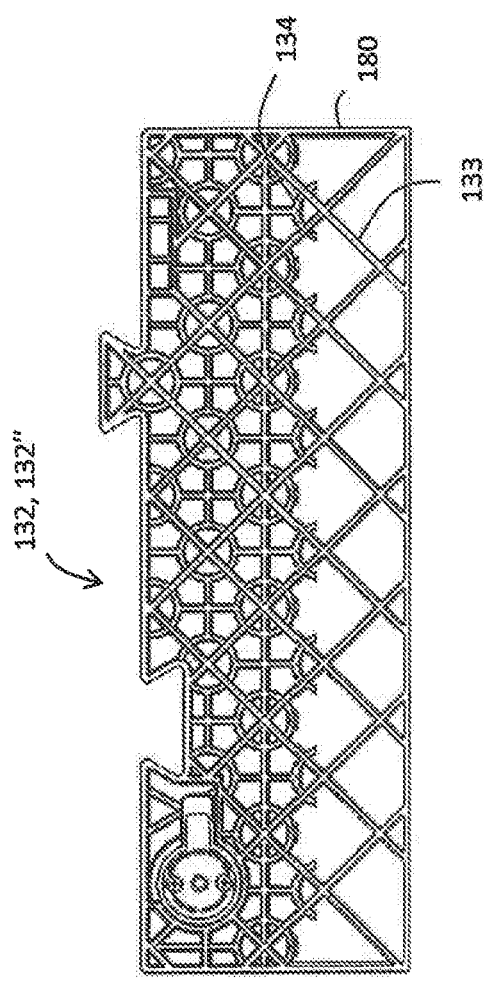

MODULAR FLOORING TILES AND SYSTEM

CLAIM OF PRIORITY

The present application claims priority to U.S. Provisional Application Ser. No. 62/615,076 filed on Jan. 9, 2018, the contents of which are incorporated herein by reference in its entirety.

FIELD OF THE INVENTION

The present invention is directed to various modular floor tiles used collectively in a floor covering system that can accommodate cables therein and ramps.

BACKGROUND

Modular flooring is well-known to provide temporary flooring solutions in outdoor and mobile settings, such as social, sporting and entertainment events, military engagements and research outposts in the field. Various types of modular flooring exist, providing different benefits. Many provide support for pedestrian and/or vehicular traffic thereon, some even for heavy duty loads. These often require extremely durable materials formed into solid tiles, and often require screws, cam bolts, and other fastening hardware to securely connect adjacent tiles to prevent them from coming apart under the heavy load and/or traffic, such as disclosed in United States Patent Application Publication No. 2004/0005430. These fasteners or parts thereof may be lost in transit, leading to problems when it comes to assembling. Moreover, such fasteners require tools to assemble, from screwdrivers, hex bolts, to large dedicated tools, all of which must be transported with the tiles to the site where needed. These tools add to the transportation volume and costs. They are also subject to being lost in transit or between events, making it impossible to assemble or disassemble the tiles.

Some tiles rely on the use of connectors extending from the sides to connect with adjacent tiles. For instance, in U.S. Pat. No. 9,051,739, flooring tiles are disclosed which have connector loops extending from their sides which engage receiver pins for connection. Optional cams for additional connection are also disclosed. In U.S. Pat. No. 5,777,266, male and female connectors are adapted to be latched to complimentary connectors on adjacent tiles to connect tiles to one another. However, these solutions do not permit thermal expansion or contraction which may be needed to accommodate varying temperatures.

Many known modular floor tiles include interior support ribs or walls that provide structural support to the tile. For instance, U.S. Pat. Nos. 8,397,466; 5,922,106; 7,571,573; and 5,787,654 disclose floor tiles having multiple ribs for structural support. However, these ribs form hexagons, honeycomb features, triangles, overlapping grids and the like that define vertices. These ribs are also linear in shape. Some floor tiles, such as those disclosed in U.S. Pat. No. 8,756,882, include curves or arches within the tiles. However, these do not provide structural support.

What is still needed in the field, therefore, are modular floor tiles and systems that may be used in applications where high load capacities are needed but which also permit thermal expansion and contraction. Floor tiles that may be lightweight enough to be easily transported and yet are sufficiently strong for high loads is needed. Temporary flooring solutions that do not have loose parts or require tools which may be lost in transit would also be beneficial.

SUMMARY

Modular floor tiles and systems comprised thereof are disclosed. Such floor tiles and systems are suitable for use in outdoor mobile or temporary flooring applications that can withstand even extreme weather conditions, such as in arctic and desert environments. They can also withstand heavy load requirements, such as up to 500 psi. The floor tiles have no loose pieces and require no tools to assemble or disassemble into flooring systems, making them easy to use in any conditions.

The floor tiles include first and second surfaces with at least one side extending therebetween, defining the height of the tile. The first surface is configured to receive pedestrian and vehicular traffic and to otherwise support weight. The second surface is opposite from the first surface and is configured to contact a support surface such as the ground on which the floor tile is placed for use. The second surface may be open to permit water and other debris to pass through the tile and also to permit better grip on the underlying ground.

The tiles further include at least one primary wall extending the height of the tile and within the interior of the tile to provide structural support to the first surface. These primary walls may be configured in an intersecting grid to provide increased structural support. At least one secondary wall is included which contacts and supports the primary walls. The secondary walls preferably have a height less than that of the primary walls, such as about half the height thereof. At least some of the secondary walls may be non-linear, such as circular or semi-circular, and may support the primary walls along the wall length or to either side of a vertex formed by intersecting primary walls. The size, height ratio and configuration of the secondary walls with respect to the primary walls confers a surprising amount of load capacity to the floor tile, such as up to 500 psi. This is unseen in currently available floor tiles.

The tiles also include at least one joining member and a corresponding joining receiver. Each joining member is configured to be received and restrained with a joining receiver on an adjacent tile when placed next to one another. This positioning provides a puzzle-piece type fit and restricts lateral movement or shifting of the tiles along the underlying ground or support surface. Though configured to fit together, the tiles nevertheless include a gap even when so joined, allowing for thermal expansion and compression with changing temperatures and/or conditions such as humidity or ice formation.

The tiles also include at least one fastener that may be selectively moved between locked and unlocked positions. In an unlocked position, the fastener remains within the tile in which it is set. When moved to a locked position, such as by rotating the fastener, at least a portion of the fastener extends through an associated slot in the side of the tile and into a corresponding slot on the adjacent tile. In at least one embodiment, the fastener includes a tab that extends therefrom. It is this tab which extends through a tab slot and into a receiving slot in an adjacent tile. The tiles may further include tab pockets corresponding to tab slots and receiving pockets corresponding to receiving slots, formed at least partially by primary walls within the tiles, that are dimensioned to receive and retain the tab when positioned therein.

In certain embodiments, the tiles may also include cable channels dimensioned to receive and retain at least one cable therein, such as power, data and audio-visual cables. These cable channels permit such cables, which are often necessary in temporary situation where the present invention would be needed, to be run through the tiles and/or system as needed but which is concealed from the first surface so does not impede vehicular or foot traffic. The cable channels may run parallel to one another or may intersect one another within the tile, allowing the direction of the cables to be changed. A cover plate may be positioned above and covering the cable channels to protect the cables therein and provide walking or driving surface. Such tiles may also include at least one support extending through the cable channel to the cover and providing structural support to the cover plate when positioned over the cable channel(s). However, the supports do not interfere with the routing of cables through the channels.

In some embodiments, the floor tiles may include an incline portion having an angled first surface extending from the ground to the full height of the tile. Such tiles may be used as a ramp at the edges of a flooring system to provide access to the system for wheeled vehicles and devices.

The present invention also includes a modular flooring system that includes any number of modular floor tiles as described. Any combination of the types of tiles may be used for a fully customizable system. The tiles may be easily connected to one another by positioning them adjacent to one another so the joining members and corresponding joining receivers are engaged, thus restricting further lateral movement. The fasteners may then be moved from an unlocked position to a locked position to restrict further vertical movement. The fasteners may be locked and unlocked manually, using only a finger or thumb. Thus, the system does not require tools to assemble or disassemble.

The modular floor tiles and systems of the present invention, together with their particular features and advantages, will become more apparent from the following detailed description and with reference to the appended drawings.

DESCRIPTION OF THE DRAWINGS

FIG. 12 is a planar view of the first surface of the modular floor tile of FIG. 10.

FIG. 13 is a planar view of the opposite second surface of the modular floor tile of FIG. 12.

Like reference numerals refer to like parts throughout the several views of the drawings.

DETAILED DESCRIPTION

The present invention is directed to modular floor tiles and a system thereof which are quickly and easily assembled and disassembled without the need for tools in the field. The present modular floor tiles and system are sufficiently durable to withstand high loads, such as up to 500 psi, even extreme weather conditions such as very high or low temperatures as may be experienced in the desert and/or arctic, including temperature fluctuations.

Figure 1:
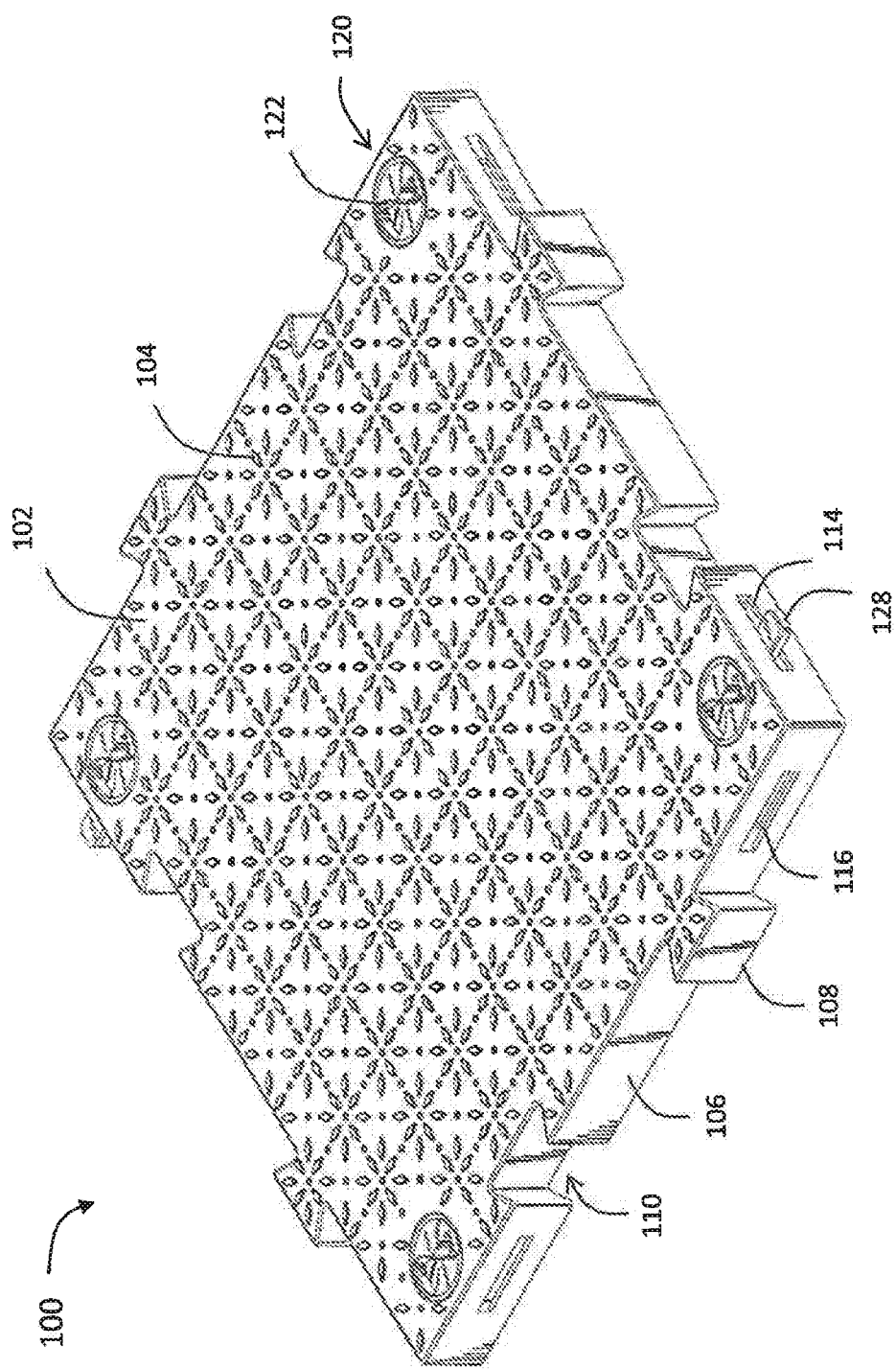
FIG. 1 is an isometric view of one embodiment of the modular floor tile showing the first surface.
Figure 2:
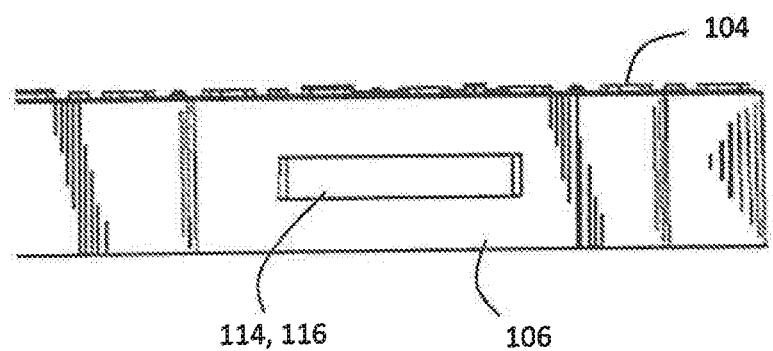
FIG. 2 is a detail elevation view of one side of the modular floor tile.

Referring now to the Figures, a first embodiment of a modular floor tile 100 of the present invention is shown in FIGS. 1-5. The floor tiles 100 may have any size and dimensions as is suitable for a particular application. In at least one embodiment, the floor tiles 100 may measure about 710 mm on each side and about 53 mm in height. This is but one illustrative example. The floor tile 100 includes a first surface 102 upon which pedestrians, traffic, vehicles, equipment, and other sources of load may interact with the tile 100. The first surface 102 may include at least one frictional element 104 that provides increased traction on the first surface 102 of the tile 100, as seen in FIGS. 1 and 2. These frictional elements 104 may be any size and shape, such as but not limited to circular, semi-circular, triangular, trapezoidal, pyramidal, square, rectangular, ovoid, curvilinear, and other shapes and designs. The frictional elements 104 may be arranged in patterns that promote traction and reduce slippage while traversing the first surface 102 of the tile, such as but not limited to grids, geometrical or non-geometrical patterns, designs and the like. The frictional elements 104 may extend from the first surface 102 or may be recessed within the first surface 102, such as bumps or grooves. The height of the frictional elements 104 are preferably sufficiently high to provide traction, but also sufficiently minimal to avoid being a tripping hazard. The various frictional elements 104 may have the same height or different heights from one another. For instance, in some embodiments certain ones of the frictional elements 104 may have a slightly greater height than the surrounding frictional elements 104. These higher frictional elements 104 may be high enough to catch on the underside of an adjacent floor tile 100 when stacked vertically, to restrict sliding of floor tiles 100 when they are stacked, such as for storage and transport. However, even these higher frictional elements 104 are not of such a height that they are a tripping hazard or impede foot or vehicular traffic along the first surface 102.

Figure 4:
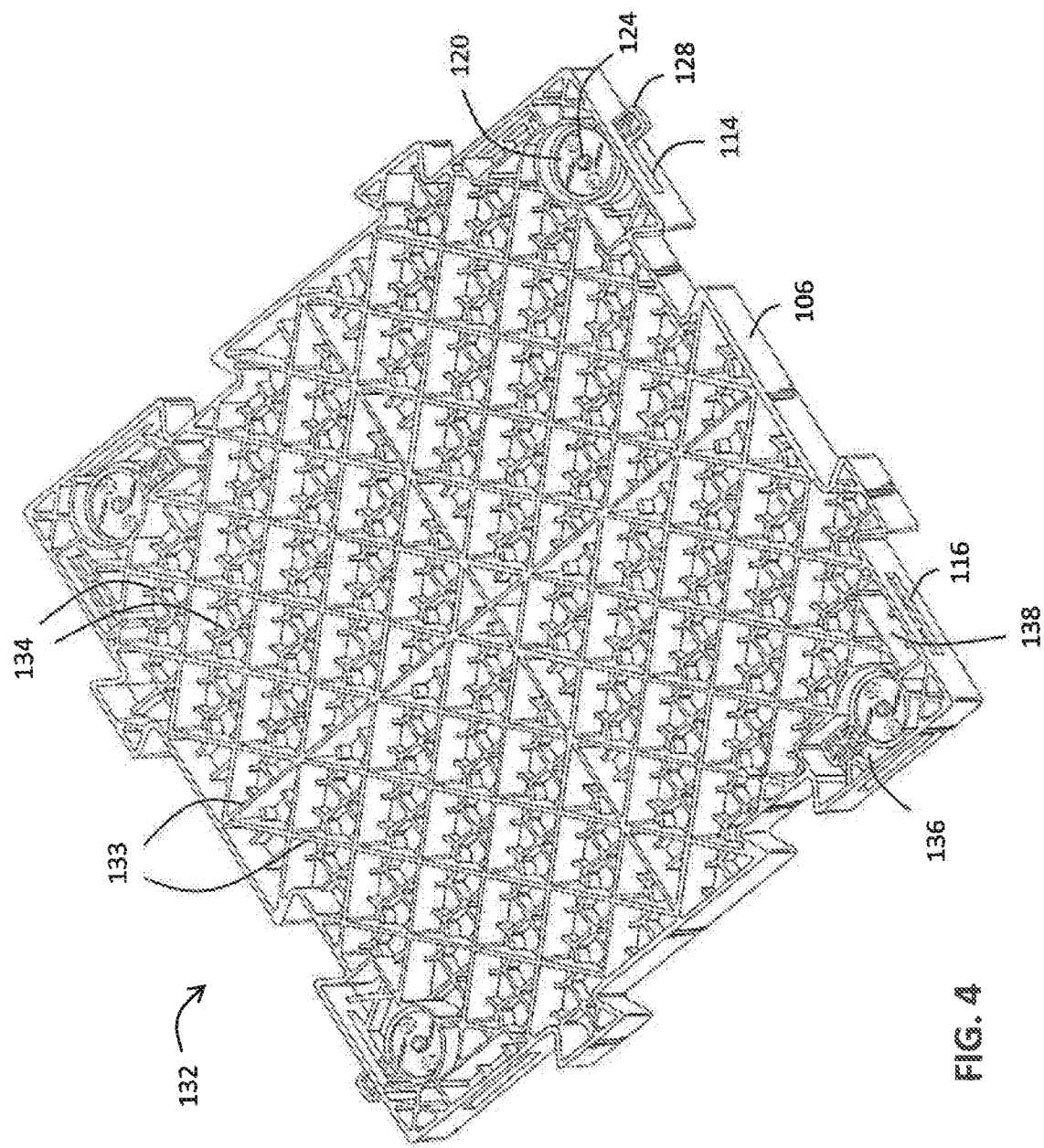
FIG. 4 is an isometric view of the modular floor tile of FIG. 1 showing the opposite second surface.
Figure 5:
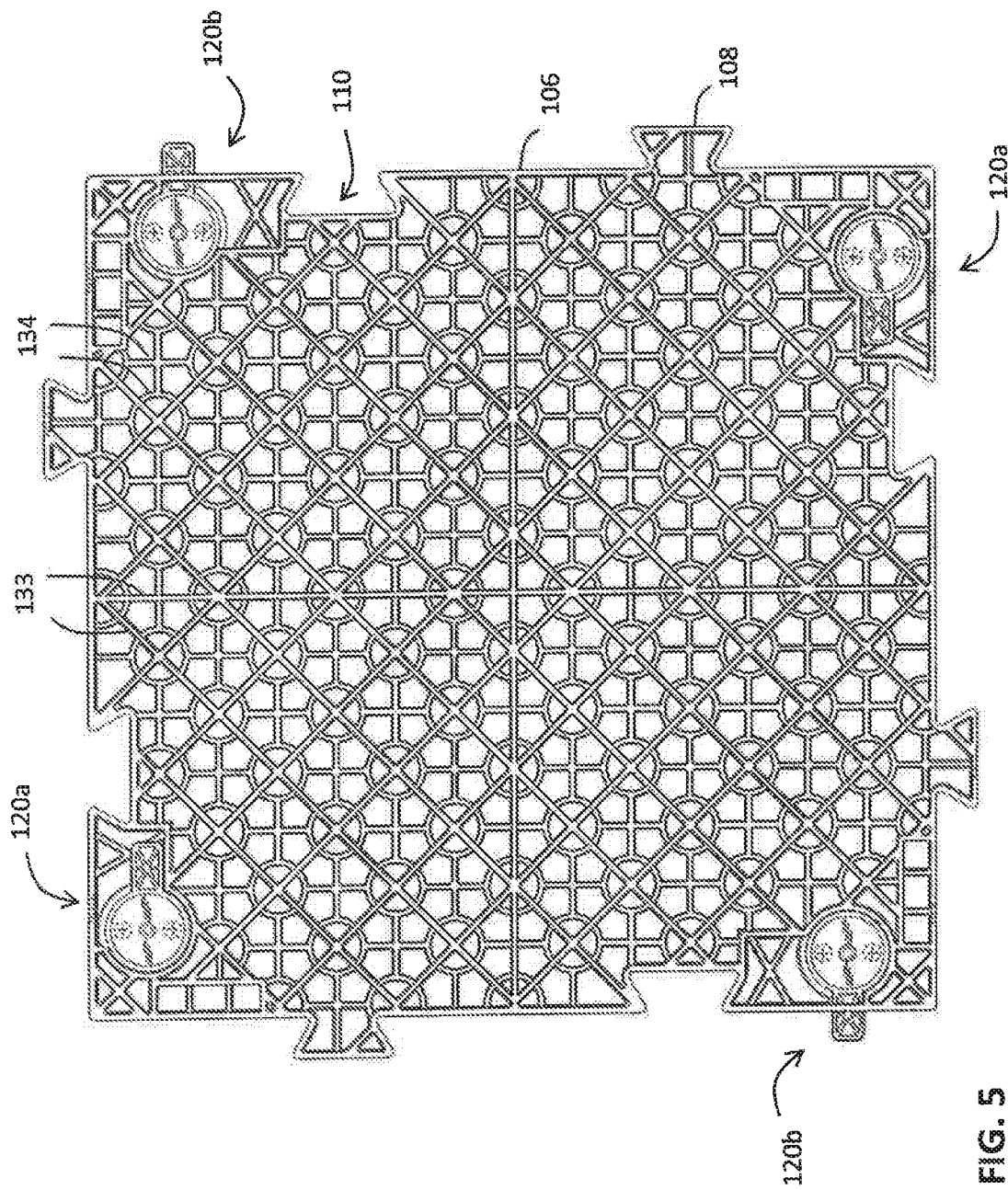
FIG. 5 is a planar view of the modular floor tile of FIG. 4.

The modular floor tile 100 also includes a second surface 132 opposite the first surface 102, as shown in FIGS. 4 and 5. The second surface 132 is positioned along a support surface when in use, such as the ground in an outdoor environment or under a tent. In at least one embodiment, the second surface 132 may be open to the interior of the tile 100, allowing fluids to run through the tile 100. The open construction of the second surface 132 may also have the added benefit of allowing the grass and other vegetation under the floor tile 100 to continue growing without stifling or suffocation and may allow for better grip on the ground underneath in rocky, sandy, snowy or icy terrain. In some embodiments, however, the second surface 132 may be solid, providing a closed surface for the underside of the tile 100.

The modular floor tiles 100 include a plurality of interior walls that run throughout the tile. For instance, at least one, through preferably a plurality of primary walls 133 extend between the first surface 102 and the second surface 132, and therefore may have the same height dimension as the tile 100. The primary walls 133 may extend through the interior of the tile 100 and may terminate at a side 106 of the tile 100. The primary walls 133 are load-bearing and can withstand great pressures, such as of up to 500 psi (3.5 mPa). The primary walls 133 may be arranged in a pattern to distribute weight, such as a lattice or grid where primary walls 133 intersect other primary walls 133, forming vertices at the points of intersection as shown in FIG. 4. The angles of intersection may be any angle, though in at least one embodiment the primary walls 133 intersect at right angles, as in FIG. 4. However, other arrangements and patterns are also possible. The primary walls 133 may be made of the same material as the first surface 102 of the tile 100, such as but not limited to plastic like polypropylene, polyethylene, polystyrene, acrylonitrile butadiene styrene, and polyvinylchloride. In a preferred embodiment, the tiles 100 may be constructed of high-density polyethylene (HDPE) post-industrial recycled plastic, optionally reinforced with adhesives for added strength, flex and impact characteristics, impact modifiers for added strength, UV resistant fillers to prevent degradation and delamination and anti-static additives.

At least one, though preferably a plurality of secondary walls 134 are also included throughout the tile 100 and are viewable from the open second side 132 of the tile 100, with reference to FIG. 4. The secondary walls 134 are interposed among the primary walls 133 and provide support to the primary walls 133. The secondary walls 134 may terminate at any point along a section of primary wall 133, rather than at a vertex. However, at least some of the secondary walls 134 are disposed to contact the primary walls 133 at either side of a vertex of primary walls 133 and therefore supports the vertex. As shown in FIG. 4, all sides of a vertex of intersecting primary walls 133 may be supported by different ones of secondary walls 134, such that the entire vertex is supported. In other embodiments, at least one side of the vertex of primary walls 133 is supported by a secondary wall 134. The secondary walls 134 may be linear or non-linear/curved, and combinations thereof such that some secondary walls 134 are linear and some are curved, as in FIG. 4. The secondary walls 134 may also comprise a pattern that facilitates supporting the primary walls 133. For example, the secondary walls 134 may form a pattern of interconnected circles, where curved or semi-circular secondary walls 134 contact, terminate or abut the primary walls 133, and linear secondary walls 134 span between curved secondary walls 134 as seen in FIGS. 4 and 5. The patterns of primary and secondary walls 133, 134 may be overlaid or interworked with one another to provide a network of walls throughout the tile 100, as best seen in FIG. 5. This is distinct from other known patterns of walls of floor tiles, where support ribs intersect at vertices only.

The secondary walls 134 have a smaller height dimension than the primary walls 133. In a preferred embodiment, as seen in FIG. 4, the secondary walls 134 may have approximately half the height of the primary walls 133. It was discovered that this ratio of height for the secondary walls 134 to the primary walls 133 provides the most effective and efficient support for the load capacity of the tiles 100, enabling higher load capacity than other height ratios. For instance, it was found that load performance is optimal when the secondary walls 134 are about half the height of the primary walls 133, permitting load capacities of up to 500 psi for example. When secondary walls 134 are the same height as the primary walls 133, the maximum load capacity may be less than 500 psi. Similarly, when secondary walls 134 are less than half the height of the primary walls 133, the maximum load capacity may be less than 500 psi. However, it should be understood that the present invention contemplates secondary walls 134 of any height. The secondary walls 134 extend from the underside of the first surface 102 of the tile, and in preferred embodiments do not reach the opposite second surface 132 of the tile 100, as seen in FIG. 4. The secondary walls 134 may be formed of any suitable material, which may be the same or different from the primary walls 133 and/or first surface 102, as listed above.

The tiles 100 include at least one side 106 which forms a perimeter of the tile. This perimetric side 106 of the tile extends from the first surface 102 to the second surface 132 and therefore defines the height of the floor tile 100. In some embodiments there may be one side 106 that stretches around the entire perimeter of the tile 100. In other embodiments, as shown in the Figures, there may be a plurality of sides 106 in each tile 100. As shown in FIGS. 1 and 4, each side 106 may include at least one of a joining member 108 or joining receiver 110. The joining member 108 and joining receiver 110 are correspondingly configured to one another such that the joining member 108 of one floor tile 100 engages a corresponding joining receiver 110 of an adjacent tile 100 to connect floor tiles 100 to one another. In at least one embodiment, the joining member 108 and receiver 110 are configured to so the joining member 108 of one tile 100 is received and restrained within a corresponding joining receiver 110 on an adjacent tile 100. The joining member 108 and receiver 110 may provide a mating fit in some instances, such as when they are inversely shaped to one another. In at least one embodiment, as seen in FIG. 1, joining members 108 may extend outwardly from the side 106 of the tile 100, whereas joining receivers 110 are recessed inwardly from the side 106. The joining members 108 and receivers 110 may comprise any shape, such as trapezoidal as depicted in the Figures, although any suitable corresponding shape is contemplated. There may be any number of joining members 108 and/or joining receivers 110 on each side 106 of the tiles 100, though in at least one embodiment there may be the same number of joining members 108 and/or joining receivers 110 on a common side 106. For instance, the Figures show each side 106 having one outwardly extending joining member 108 and one inwardly recessed joining receiver 110, although each side 106 may have more depending on the size of the tile 100.

Figure 14:
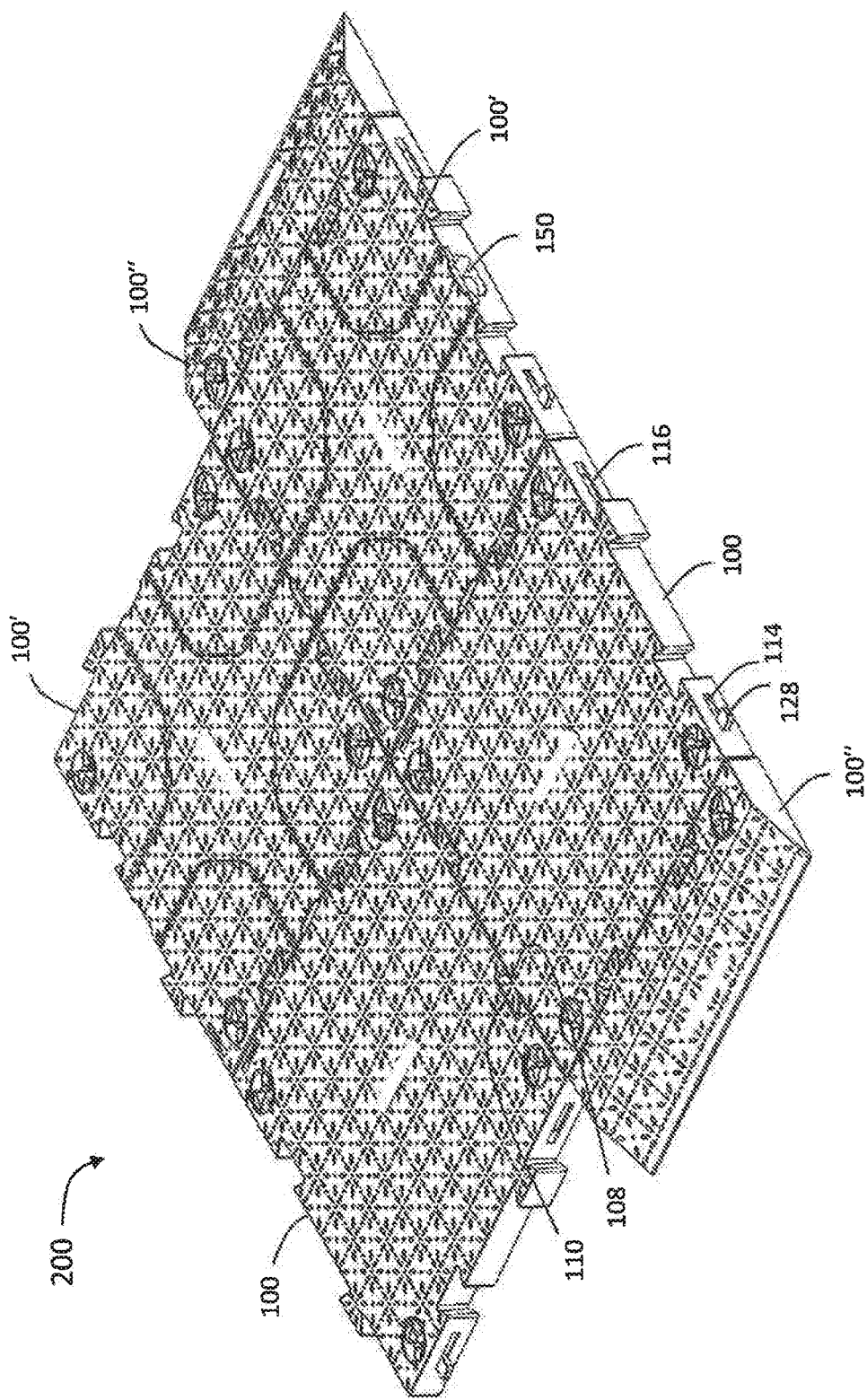
FIG. 14 is an isometric view of a modular flooring system showing exemplary tiles of each embodiment from a first surface.
Figure 15:
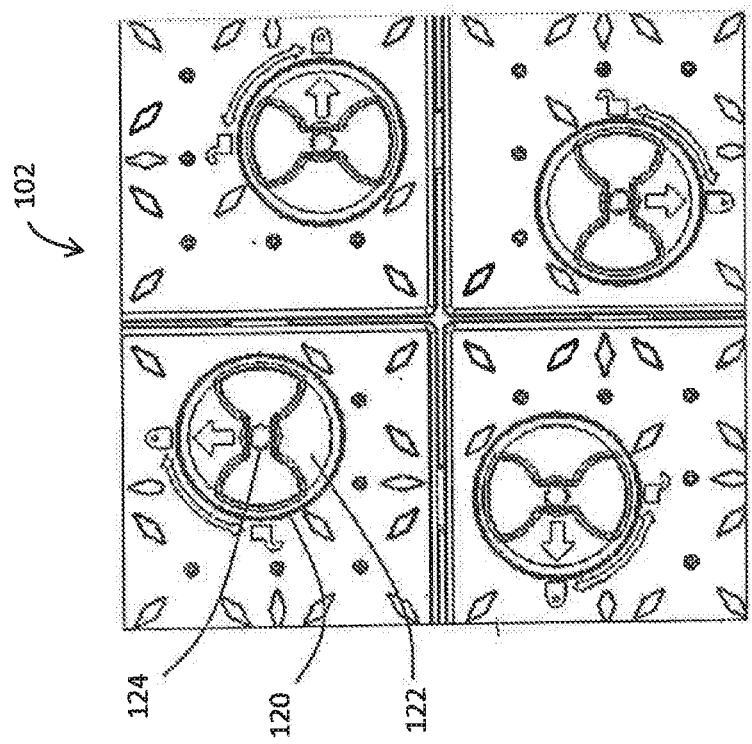
FIG. 15 is a detail plan view of the intersection of four exemplary tiles of the modular flooring system of FIG. 14, shown from a first surface.

Although corresponding joining members 108 and receivers 110 are similarly or correspondingly shaped, joining members 108 and receivers 110 of adjacent tiles 100 may still be spaced apart to form a loose association when joined. This holds the adjacent tiles 100 in proximity to one another and limits lateral movement of the tiles 100 relative to one another in a horizontal direction. However, even when the joining members 108 and corresponding joining receivers 110 of adjacent tiles 100 are fit together, a gap 210 exists between adjacent tiles, as depicted in FIGS. 14 and 15. This gap 210 permits thermal expansion and contraction of the tiles 100, to accommodate changing conditions and extreme temperatures.

Each side 106 may also include at least one slot, such as at least one of a tab slot 114 and a receiving slot 116. As shown in FIGS. 1, 2 and 4, the tab slots 114 and receiving slots 116 are each dimensioned to accommodate and receive at least a portion of a fastener 120 therethrough, as described in greater detail below. The tab slots 114 may be specifically configured and dimensioned to permit at least a portion of a fastener 120 therethrough. The receiving slots 116 may be configured to receive at least a portion of the fastener 120 therethrough.

Figure 3:
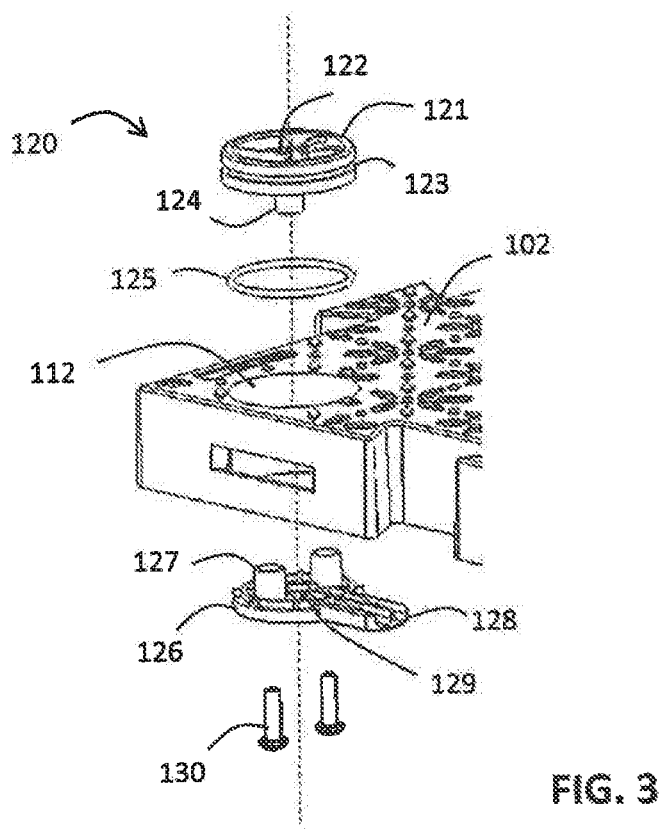
FIG. 3 is a detail view of the modular floor tile showing an exploded view of a fastener.

Returning to FIGS. 1-5, each tile 100 also includes at least one fastener 120 which may be located anywhere near or in proximity to a side 106 to provide selective attachment of one tile 100 to an adjacent tile 100. For example, the Figures show a fastener 120 at each corner of a tile 100, but there may be more or fewer fasteners 120 as desired. Each fastener 120 is associated with a tab slot 114 in a side 106 and may also be associated with or near to a receiving slot 116, which may be on the same or different side 106 as the associated tab slot 114. As best shown in FIGS. 1 and 3, each fastener 120 extends from the first surface 102 toward the interior of the tile 100. In some embodiments, the fastener 120 may extend between the first and second surfaces 102, 132, though in at least one embodiment it does not extend all the way to the second surface 132 such that the fastener 120 is not load-bearing. The fasteners 120 are selectively positionable between an unlocked position 120a and a locked position 120b. Therefore, the fasteners 120 should preferably be free to move when selectively activated to lock or unlock, as described in greater detail below.

Each fastener 120 includes an actuating surface 122 which may be located at the first surface 102 or a side 106 of the tile 100. The actuating surface 122 may be engaged to selectively activate the fastener 120 to move the fastener 120 between locked and unlocked positions 120b, 120a. The actuating surface 122 may be engaged manually, such as with a thumb or finger, and without the need for or use of tools. The actuating surface 122 may have a relief or extension in any configuration, form or design as may facilitate the gripping of and application of pressure to the actuating surface 122 for engaging it. For example, the actuating surface 122 may include a recessed portion into which a thumb or finger may be placed in order to activate the fastener 120. The fastener 120 may be selectively activated by any suitable means, such as but not limited to pressing, pushing, pulling and/or rotating. In at least one embodiment, torque may be applied to the actuating surface 122 to rotate the fastener 120 to selectively move it between the locked and unlocked positions 120b, 120a.

In at least one embodiment, the fastener 120 may include a tab 128 that extends outwardly from the fastener 120. The tab 128 may extend from any portion of the fastener 120, such as from a central body and/or axis thereof as depicted in FIG. 3. The tab 128 may be formed of the same material as other parts of the fastener 120, which may also be the same or different material from which the first surface 102 and/or primary and secondary walls 133, 134 may be made. The tab 128 extends by a length that is longer than the distance from the fastener 120 to the nearest or associated side 106. In the unlocked position 120a, as shown in the upper left and lower right corners of FIG. 5, the tab 128 extends into the interior space of the tile 100 in which the fastener 120 is housed. The tile 100 may also include at least one tab pocket 136 formed in the second surface 132 and/or interior of the tile 100, as shown in FIG. 4. The tab pocket 136 may be formed, at least in part, by a side 106, an associated tab slot 114 formed therein, and at least one primary wall 132. Accordingly, the tab pocket 136 may be in communication with the tab slot 114. In the unlocked position 120a, the tab 128 may be retained within the tab pocket 136. In the locked position 120b, shown in the lower left and upper right corners of FIG. 5, the fastener 120 may be positioned such that the tab 128 extends through the associated tab slot 114 and beyond the side 106 of the tile 100. In embodiments having tab pockets 136, the tab 128 may extend outwardly from the tab pocket 136 and through the associated tab slot 114.

Figure 16:
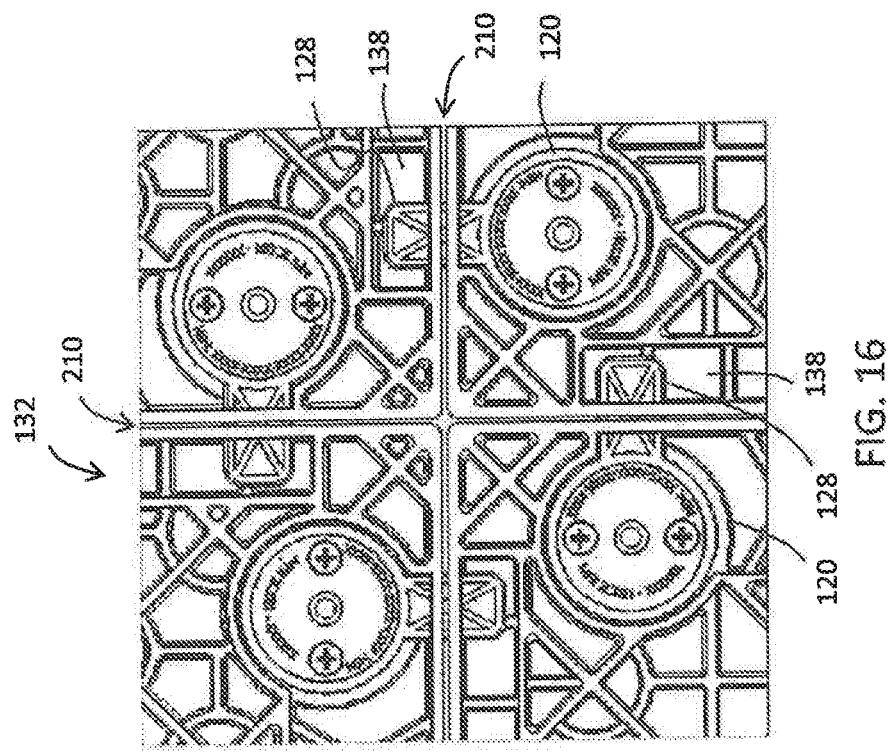
FIG. 16 is a detail plan view of the second surface of FIG. 15.

When an adjacent tile 100 is present and aligned with the first tile 100, and the joining members 108 and joining receivers 110 are engaged as described above, the tab 128 of the fastener 120 extends through the tab slot 114 of one tile 100 and into a corresponding receiving slot 116 in a facing side 106 of an adjacent tile 100, as shown in FIG. 16. Accordingly, the tab 128 may be long enough to span from one tile 100 into another adjacent tile 100 in the locked position 120b, and the receiving slot 116 is dimensioned to receive and retain the tab 128 of another tile 100 therein. Each tile 100 may also include at least one receiving pocket 138 formed in the second surface 132 and/or interior of the tile 100, as shown in FIG. 4. The receiving pocket 138 may be formed, at least in part, by a side 106, an associated receiving slot 116 formed therein, and at least one primary wall 132. Accordingly, the receiving pocket 138 may be in communication with the receiving slot 116. In the locked position 120b, the tab 128 from a fastener 120 of one tile 100 may be received and retained within the receiving pocket 138, as shown in FIG. 16. However, it should be appreciated that tab pockets 136 and receiving pockets 138 are not required, and there may only be tab slots 114 and receiving slots 116.

Notably, in the locked position 120b, the fastener 120 and/or tab 128 thereof may restrict vertical movement or shifting of the adjoining floor tiles 100. For instance, the tab 128 within the receiving slot 138 is limited in movement in the direction transverse to the receiving slot 138 opening. To some degree, the fastener 120, tab 128 and/or receiving slot 138 interaction may also limit lateral movement as well. Therefore, between the joining members 108 and joining receivers 110, and the tabs 128 and receiving slots 138, adjacent tiles 100 may be joined to one another and selectively locked in a way that restricts shifting in all directions and yet still permits expansion and contraction due to temperature fluctuations or other environmental conditions. All of this is also enabled without the use of tools or additional parts, thus allowing for easy assembly and disassembly.

As shown in FIG. 3, the fastener 120 may include a fastener top 121 and opposite fastener bottom 126 that collectively form the body of the fastener 120. The fastener top 121 may include the actuating surface 122 formed therein, and therefore may be located at or substantially planar to the first surface 102 of the tile 100. The fastener bottom 126 may include the tab 128 integrally formed therein and extending therefrom. The fastener top 121 and bottom 126 may have substantially the same shape and dimension in a preferred embodiment, which may correspond to an aperture 112 in the tile. The aperture 112 may therefore be dimensioned to receive and retain the fastener 120 therein and may extend through the entire height of the floor tile 100. The fastener top 121 and bottom 126 may be integrally formed with one another in a single-piece construction, such as being molded of a single mold. In other embodiments, the fastener top 121 and bottom 126 may be separate pieces installed in a tile 100 by being aligned with an aperture 112 and one another, inserted into the aperture 112, and joined together from the first and second surfaces 102, 132 of the tile, respectively. Connectors 130 such as screws, pegs or bolts may extend between the fastener top 121 and bottom 126 to secure them to each other. Connector channels 127 may extend from the fastener bottom 126 through which the connectors 130 may be disposed in securing the fastener top 121 and bottom 126 together. In other embodiments, the fastener top 121 and bottom 126 may be secured to one another through permanent methods, such as adhesive or welding.

Each fastener 120 may also have a bore 124 running axially through the fastener 120, as shown in FIG. 3. The bore 124 extends from the fastener top 121 and is disposed through a suitably dimensioned aperture 129 in the fastener bottom 126 when top and bottom 121, 126 are joined. The bore 124 additionally may extend from the first surface 102 of the tile 100 to the second surface 132 when the fastener 120 is installed therein. The bore 124 is open at both sides, thus permitting the flow of fluids and materials, such as rain, mud, and debris, through the tile 100 without interfering with the functioning of the fastener 120. A resilient member 125, such as an O-ring or other similar sealing member, may also be included in the fastener 120 to form a fluid barrier to the interior of the tile 100, thus preventing water, dirt and debris from passing through the tile 100. In at least one embodiment, the fastener 120 may include a groove formed therein which is dimensioned to receive and retain the resilient member 125 therein. The groove may be formed in the fastener top 121 or bottom 126.

Figure 6:
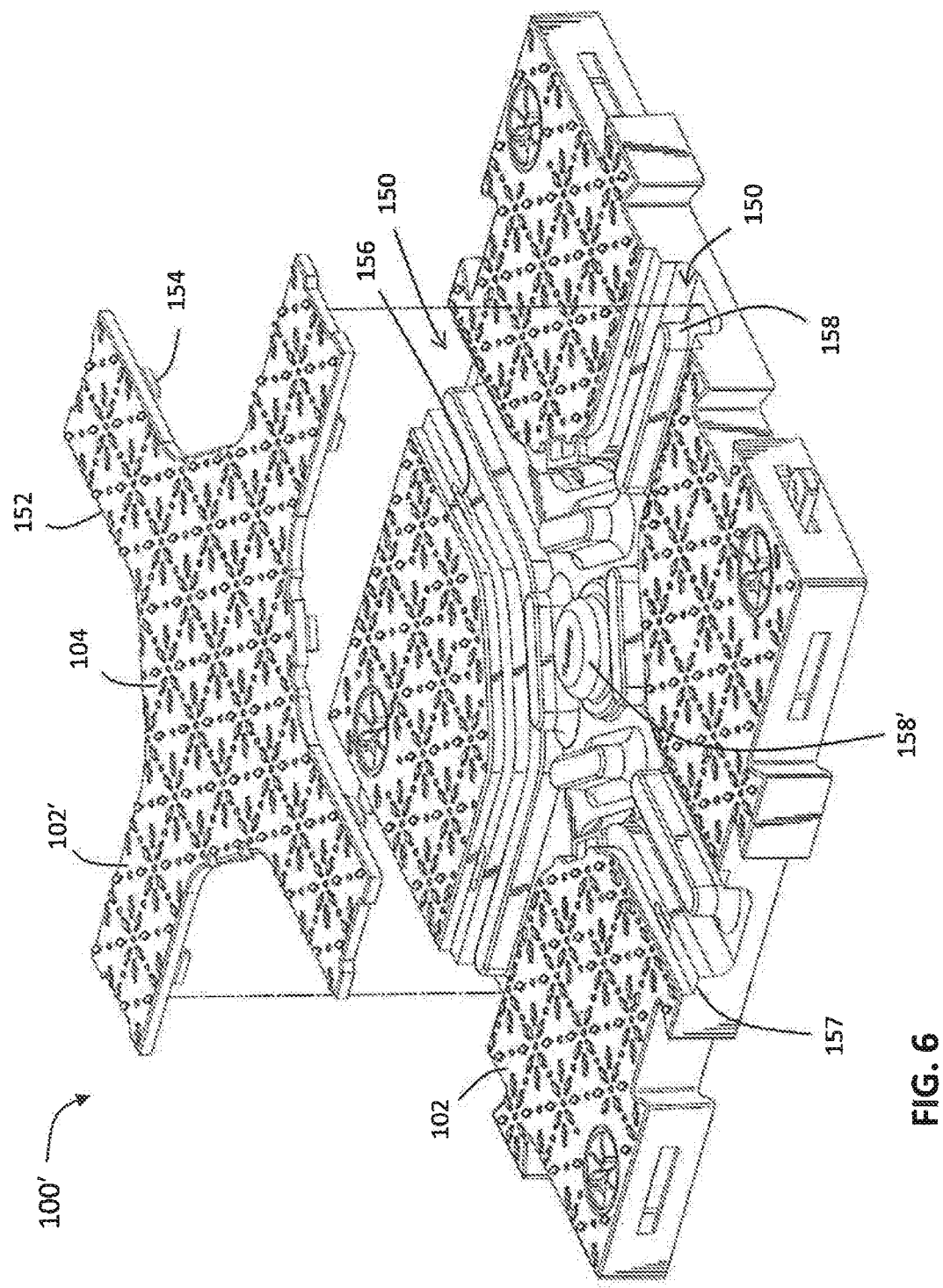
FIG. 6 is a partially exploded view of a second embodiment of the modular floor tile showing the first surface and cable channels.
Figure 7:
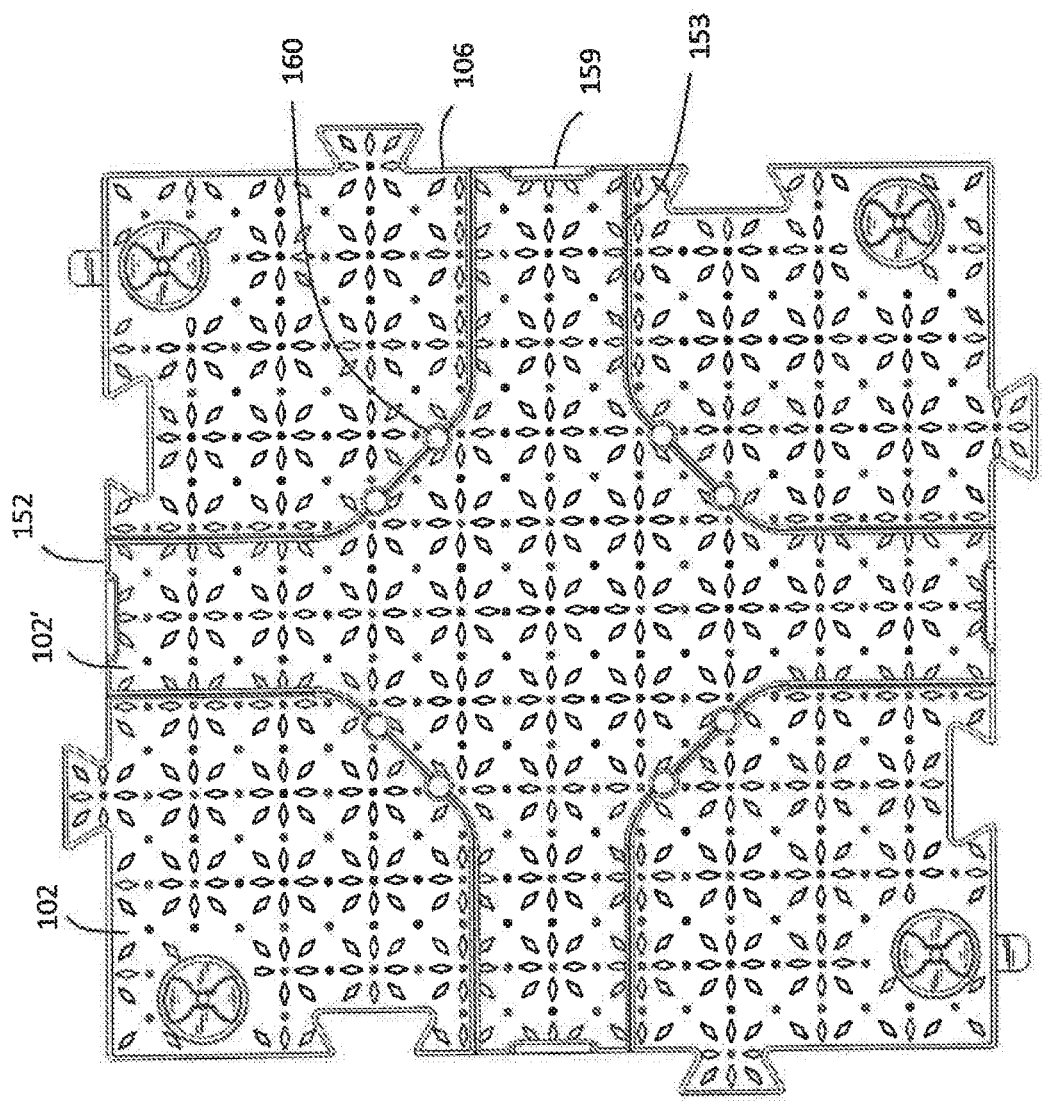
FIG. 7 is a planar view of the modular floor tile of FIG. 6.
Figure 8:
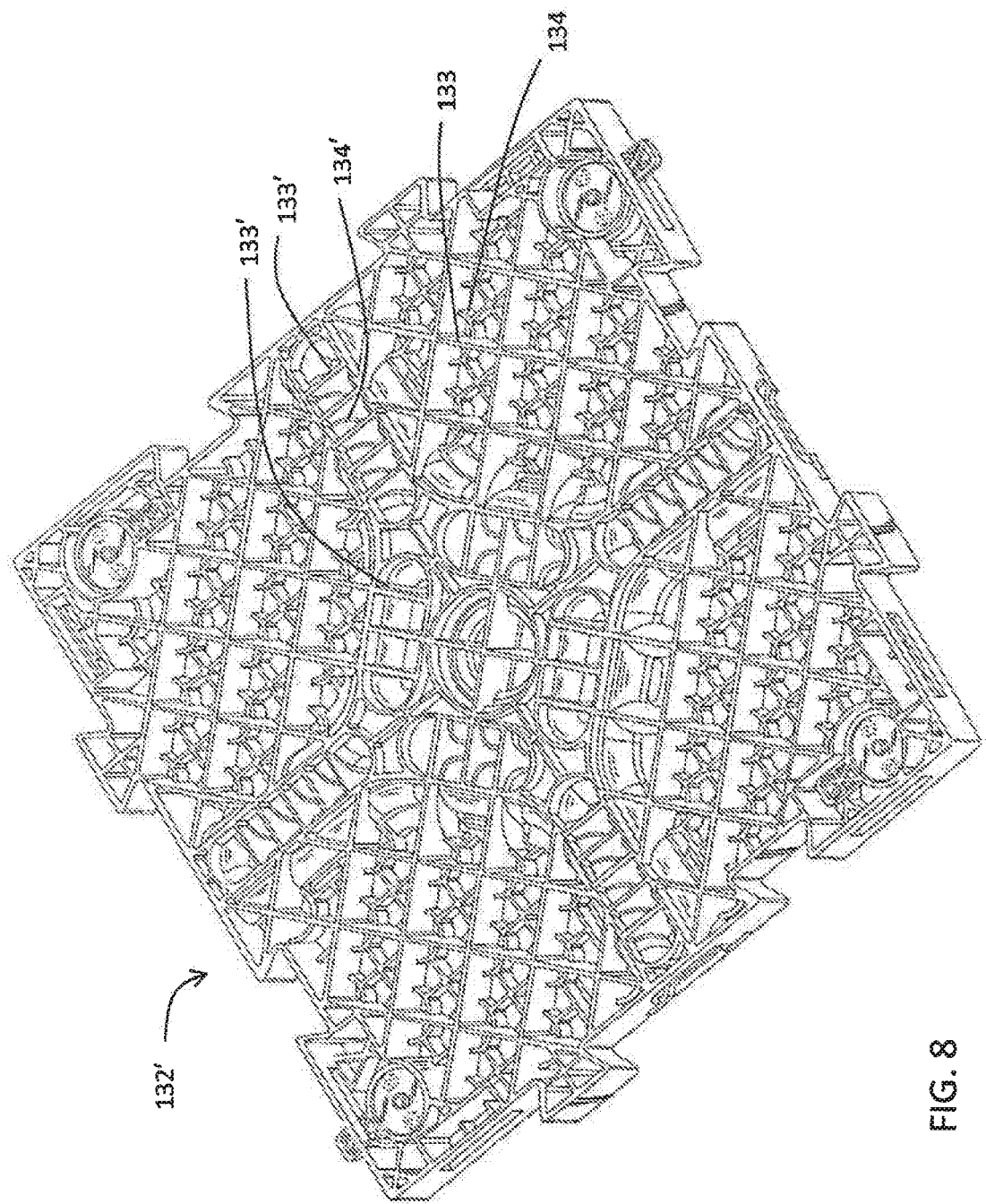
FIG. 8 an isometric view of the modular floor tile of FIG. 6 showing the opposite second surface.

Some embodiments of the modular floor tiles 100' of the present invention, depicted in FIGS. 6-9, may include any or all of the same elements discussed above, but additionally may include at least one cable channel 150 extending through the tile 100'. As seen in FIG. 6, the tile 100' may include at least one, and preferably a plurality of cable channels 150 extending from one side 106 to another side 106 of the tile 100'. In at least one embodiment, the cable channels 150 may be formed as recesses from the first surface 102 of the tile 100'. The cable channels 150 may have dimensions less than the full height of the tile 100' and/or less than the full width of the tile 100'. However, each cable channel 150 is sufficiently sized and dimensioned to receive, retain and accommodate at least one cable therein. Any type of cable may be accommodated in the channels 150, such as but not limited to power cables, data or information cables such as ethernet, sound and audio/visual (AV) cables, and other types of cables transmitting electricity, signals, information and the like from one location to another. Placement of these cables on the first surface 102 would impede movement over the tiles 100 and could pose a safety risk from tripping on the cables. Therefore, in these embodiments of the tiles 100', the cables may be placed within and/or stored inside the tile 100' to allow free movement along the first surface 102 without sacrificing safety or convenience. The cable channels 150 also retain the cables and prevent them from contacting the ground beneath the tile 100', even in embodiments where the second surface 132 of the tile 100' is open as shown in FIG. 8. In this manner, the cables are protected from the elements and environmental factors like rain, ice and snow. The cable channels 150 may extend from one side 106 of the tile 100' to the same or different side 106 of the tile 100', which may be an opposite side or an adjacent side, allowing the cables to run within the tiles 100' and not interfere with traffic along the first surface 102.

There may be any number of cable channels 150 received within in each tile, although in at least one embodiment there are at least two. The cable channels 150 may be formed in any pattern or relation to one another. For instance, in at least one embodiment, the cable channels 150 may intersect with one another within the interior of the tile 100', forming a cross configuration as depicted in FIG. 6. In other embodiments, the cable channels 150 may be parallel, perpendicular, oblique, or intersecting to one another, and may have any shape such as linear, curved, curvilinear, and any combination thereof. In the embodiment shown in FIG. 6, there are two intersecting cable channels 150.

The tile 100' may also include a cover plate 152 that is spaced apart from and covering, yet removably positionable over the cable channel(s) 150 to protect the interior and contents of the cable channels 150 while permitting traffic and other movement along the first surface 102 of the tile 100'. The cover plate 152 may cover at least a portion of a cable channel 150 when positioned in a covering, spaced apart relation to the cable channel 150. For instance, in at least one embodiment a single cover plate 152 covers all of a plurality of cable channels 150, as shown in FIGS. 6 and 7. In other embodiments, each cable channel 150 may be covered by its own dedicated cover plate 152. In still further embodiments, a cover plate 152 may cover only a portion of a cable channel 150, thus requiring a plurality of cover plates 152 to span an entire cable channel 150. The cover plate 152 may be selectively removed as needed to access the cable channel(s) 150 underneath and replaced over the cable channel(s) 150 when the tile 100' is in use. The cover plate 152 may be made of the same material as the remainder of the tile 100', or at least the first surface 102 of the tile 100', as described above. The cover plate 152 may therefore have its own first surface 102' which may be the same, similar to, or different from the first surface 102 of the remainder of the tile 100'. For instance, the first surface 102' of the cover plate 152 may be made of the same or different material as the first surface 102 of the remainder of the tile 100' and may be as durable and having similar load-bearing capacity as the surrounding first surface 102. The first surface 102' of the cover plate 152 may have any design, color, shape and configuration. The first surface 102' of the cover plate 152 may also include frictional elements 104 like those on the remainder of the first surface 102, which may form a consistent or corresponding pattern when the cover plate 152 is positioned on the tile 100' in covering relation to the cable channel(s) 150.

The channels 150 may include at least one notch 157 extending along at least a portion of the length of the channel 150 and dimensioned to receive at least a portion of a cover plate 152 therein. Where multiple cable channels 150 connect or converge, the notch 157 may also follow continuously from one channel 150 to another. Accordingly, the notch 157 may be located at or along the perimeter of the channels 150, such as along a portion of the channel near the opening at the first surface 102 and may preferably extend for the entire perimeter of the cable channel(s) 150. In other embodiments, the notch 157 may be located elsewhere in the channel 150. The notch 157 may have a height or depth corresponding to the height or thickness of the cover plate 152, such that the first surface 102' of the cover plate 152 may sit co-planar with the surrounding first surface 102 of the remainder of the tile 100' when placed. Accordingly, the notch 157 may form a lip on which the cover plate 152 rests when placed over the cable channel(s) 150. Accordingly, the notch 157 may be configured to receive the cover plate 152 when positioned on the tile 100'.

The cover plate 152 may include one or more fittings 154 along the underside of the cover plate 152, the side that lacks the frictional elements 104, and in some embodiments may extend therefrom. The fitting(s) 154 may have any shape that can be used to releasably secure the cover plate 152 to the tile 100', which in at least one embodiment may be resiliently deformable. The notch 157 may include at least one fitting receiver 156 that is dimensioned to receive at least a portion of a corresponding fitting 154 from the cover plate 152. For example, in at least one embodiment the fitting 154 may be an extrusion or set of prongs which are temporarily deformable under stress and return to an initial disposition when no longer under stress and may be correspondingly sized and shaped to a fitting receiver 156 being a hole in the notch 157. The fitting 154 and fitting receiver 156 may form a snap-fit connection to selectively and releasably attach the cover plate 152 to the tile 100'. Other types of selectively releasable connections are also contemplated herein for the fitting 154 and fitting receiver 156, such as but not limited to hook and loop fasteners and pegs.

The cover plate 152 may also include at least one first opening 159, as seen in FIG. 7. The first opening(s) 159 is configured to facilitate a person to grip and maneuver the cover plate 152, such as when placing and removing the cover plate 152 from the tile 100'. Accordingly, the first opening 159 may be a recessed portion or a hole in the cover plate 152 and may be at least large enough for a person's finger or thumb to enter. The first opening 159 may be less than the width of the cover plate 152 or an arm or portion thereof, although in some embodiments the first opening 159 may span substantially the entire width of an arm of the cover plate 152. In at least one embodiment, the first opening(s) 159 may be located at a terminal end of the cover plate 152 and coincides with the side 106 of the tile 100' when the cover plate 152 is positioned thereon. In other embodiments, however, the first opening 159 may be located anywhere along the cover plate 152. The cover plate 152 may include a number of first openings 159, such as one at each terminal end of the cover plate 152, as seen in FIG. 7.

The cover plate 152 may also include at least one second opening 160, as shown in FIG. 7. The second opening(s) 160 is dimensioned to permit at least one cable to pass therethrough, such as to enable a cable to pass up from the cable channel 150 through the cover plate 152 and/or first surface 102' of the tile 100' if access to the cable(s) is needed, such as to plug into an outlet or device. The second opening(s) 160 may be located anywhere along the cover plate 152 and may be spaced apart from one another. Since some connectors on the ends of cables are larger than the cables themselves, in some embodiments the second openings 160 may be formed in a seam 153 where the first surfaces 102, 102' of the cover plate 152 and tile 100' meet. In such embodiments, the second openings 160 may be minimized to substantially the size of the cable itself and the cover plate 152 may be removed to feed the cable through the second opening 160 to avoid having to pass the connector of the cable through the second opening 160. The cover plate 152 may then be positioned on the tile 100' with the cable extending through the second opening 160.

Figure 9:
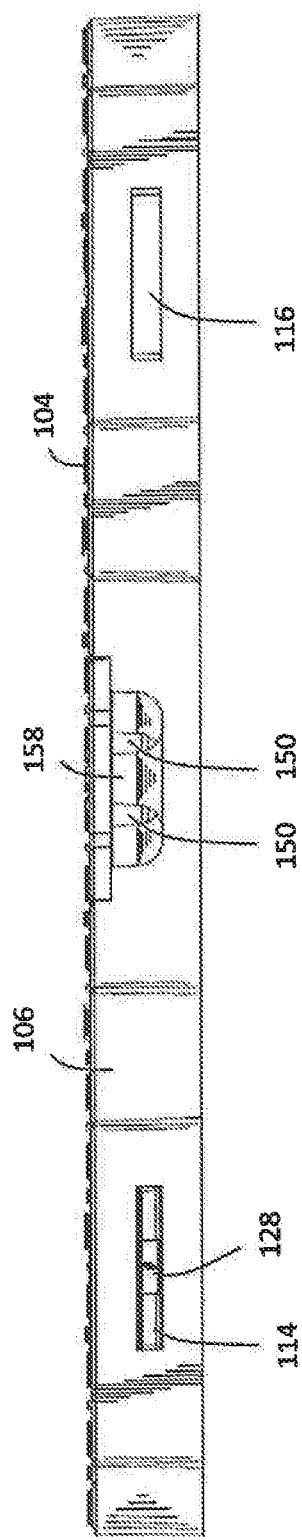
FIG. 9 is an elevation view of one side of the modular floor tile of FIG. 6.
Figure 10:
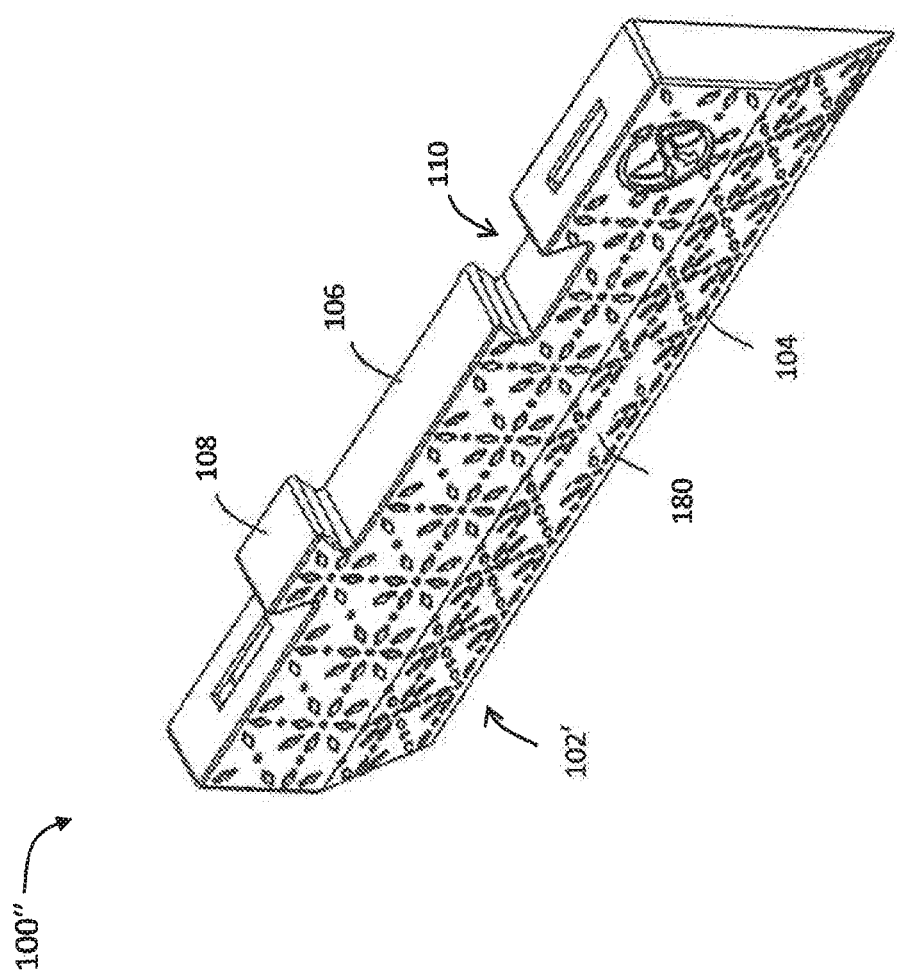
FIG. 10 is an isometric view of a third embodiment of the modular floor tile showing the first surface and incline.
Figure 11:
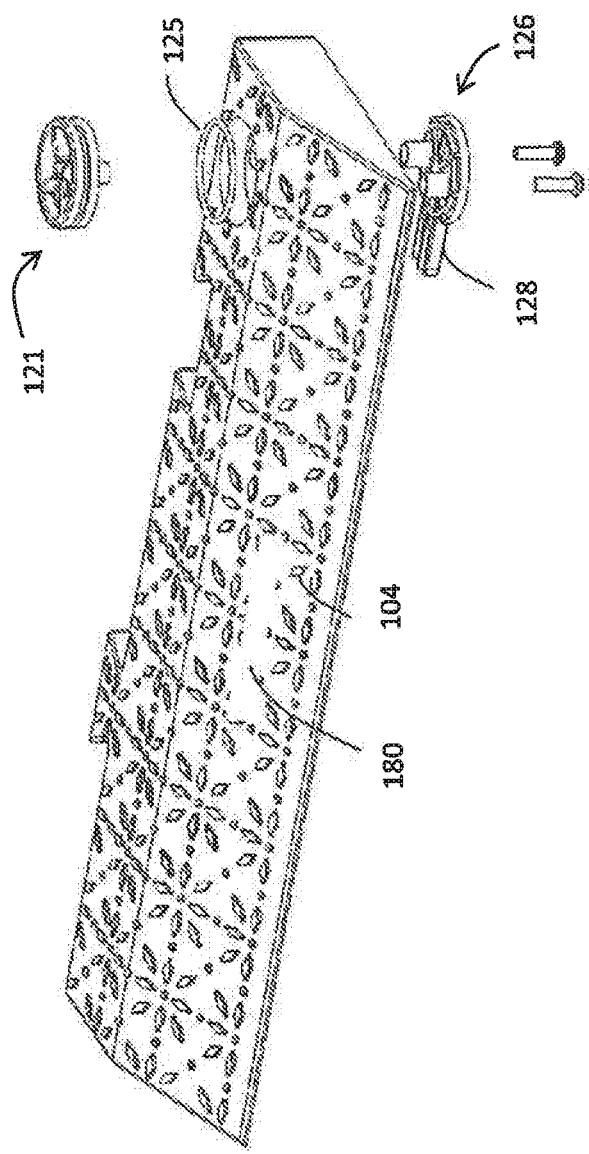
FIG. 11 is the modular floor tile of FIG. 10 showing an exploded view of a fastener.

The tile 100' may also include at least one support 158 located within each channel 150. The support(s) 158 extends from the bottom of the channel 150 to the top thereof. In some embodiments the support 158 may therefore extend to at or near the first surface 102 of the tile 100'. In other embodiments, the support(s) 158 may extend to the height of the notch 157. Since the cover plate 152 is spaced apart from the bottom of the cable channel 150 which it covers when placed, the supports 158 provide structural and load-bearing support to the cover plate 152 from within the channel 150 when positioned across the channel 150. Each channel 150 may include at least one support 158, which may be located anywhere along the channel 150. In some embodiments, at least one support 158 may be centrally located along the width of the channel 150, as depicted in FIGS. 6 and 9, but which do not obstruct the channel 150. There remains sufficient room around and/or to one or both side of the support 158 for a cable(s) to pass within the channel 150. In other embodiments, the supports 158 may be offset from center throughout the channel 150. At least one support 158 may be located at the opening of the cable channel 150 at a side 106 of the tile 100', though the supports 158 may also be located internally within the tile 100' and away from the sides 106, to provide structural support. There may be any number of supports 158 throughout the various cable channels 150 and may have any shape or configuration which may be the same or different from other supports 158. In at least one embodiment, there may be also be an additional support(s) 158' at the center of the tile 100' where cable channels 150 intersect, as seen in FIG. 6. Such central support 158' preferably extends from the floor of the channels 150 to the first surface 102 of the tile 100'. The supports 158, 158' may be formed integrally with the tile 100' and may be made of the same material as the remainder of the tile 100', though in certain embodiments the supports 158 may be made from a different material which may be studier than the remainder of the tile 100'.

The second surface 132' of the floor tiles 100' having cable channels 150 have primary and secondary walls 133, 134 as described above, but further may have primary and secondary walls 133', 134' underneath and supporting the cable channel(s) 150 and/or support(s) 158 which may differ from the primary and secondary walls 133, 134 in the remaining portion of the second surface 132'. As shown in FIG. 8, the underside of the cable channel(s) 150 and/or support(s) 158, 158' may include primary walls 133' that span a dimension of the cable channel(s) 150 and/or support(s) 158, 158', such as the width of an arm of a cable channel 150 or the width of a support 158, 158'. Such primary walls 133' may have a shorter height than the primary walls 133 of the surrounding parts of the tile 100' but may nevertheless extend the full height from the second surface 132' to the top of the cable channel 150, be it the floor or notch 157 thereof, or to the height of the support(s) 158, 158'. The primary walls 133' may not intersect in some areas but may intersect in other areas such as where the distance being spanned is sufficiently large that additional support may be needed. Further, the primary walls 133' may be wider or thicker than the other primary walls 133 of the surrounding parts of the tile 100', such as to provide increased structural support the cable channel(s) 150 and/or support(s) 158, 158'. In other embodiments, the primary walls 133' may be substantially the same thickness or thinner than the other primary walls 133 of the surrounding parts of the tile 100', such as when the configuration of the cable channel(s) 150 and/or support(s) 158, 158' already provide increased support for the cover plate 152 and/or if there is an increased density of primary walls 133' as compared to the other primary walls 133.

Similarly, secondary walls 134' underneath the cable channel(s) 150 and/or support(s) 158, 158' which support the primary walls 133' may be non-linear, such as curved. As shown in FIG. 8, the secondary walls 134' may have a different configuration than the other secondary walls 134 of the tile 100'. For instance, they may not support either side of a vertex of primary walls 133' if no such vertices exist. In addition, the secondary walls 134' may be about half the height of the primary walls 133' along at least a portion of the primary walls 133'. For example, if the height ratio of the primary and secondary walls 133', 134' may vary due to the configuration of the walls and/or the reduced height of the primary walls 133' resulting from supporting the channel(s) 150 and/or support(s) 158.

In still further embodiments, the modular floor tile 100" may be as otherwise described above but may also include an incline portion 180, as shown in FIGS. 10-13. The incline portion 180 provides a transition between the ground to the top of the modular floor tile 100". Accordingly, the incline portion 180 may span between the ground and the full height of the tile 100" and may be pitched at any angle between 0 and 90 degrees, depending on the height of the tile 100" and the length desired for the incline portion 180. The incline portion 180 may be integrally formed in the tile 100" and is preferably of unitary construction with a planar section of the tile 100". In at least one embodiment, the tile 100" includes both an incline portion 180 and a planar portion, as shown in FIGS. 10-13. In other embodiments, the tile 100" may include only an incline portion 180. The first surface 102" of the tile 100" includes the incline section 180 where weight is intended to be applied as well as the planar section where applicable. The first surface 102" may also include at least one frictional element 104 as described above, which may be positioned on the incline portion 180 or planar portion. The second surface 132" of the tile 100" also includes primary and secondary walls 133", 134" as previously described, both of which may be present in the incline portion 180 as well as the planar portion thereof. Because of the angle, and therefore changing height of the incline portion 180, the primary and secondary walls 133", 134" underneath may have similarly reducing or diminishing heights according to the change in height of the perimetric side 106 resulting from the sloped first surface 102". Due to height restrictions, there may be fewer secondary walls 134" supporting the primary walls 133" in the incline portion 180 than in the planar portion of the tile 100", and the number may reduce further as the first surface 102" of the incline portion 180 approaches the ground, as shown in FIG. 13.

The various modular floor tiles 100, 100', 100" described above may be combined in any number, combination, and arrangement to form customizable floor systems 200. FIGS. 14-16 show an exemplary demonstration of how the various tiles 100, 100', 100" may be joined. For example, modular floor tiles 100 may be used where traffic or load will be heaviest, and tiles 100' having cable channels 150 may be positioned along one side or around the edges of the flooring system 200 to permit access of the cables to and through the system 200. Tiles 100" having incline portions 180 may be included at strategic locations to provide ramps for access for vehicles and wheeled equipment. Tiles 100' having cable channels 150 may be arranged so that cable channel(s) 150 of one tile 100' align with and are continuous with cable channel(s) 150 of adjacent tiles 100', forming a pathway for cables to run through the flooring system 200 without interfering with traffic on the first surfaces 102, 102', 102" thereof.

As indicated above and illustrated in FIGS. 14-16, adjacent tiles 100, 100', 100" are joined in the system two ways. First, the tiles 100, 100', 100" are aligned and moved vertically with respect to one another, such as by lowering one tile 100, 100', 100" next to another, until the joining member 108 of one tile 100, 100', 100" is received within a corresponding joining receiver 110 of an adjacent tile 100, 100', 100", as shown in FIG. 14. Once the tiles 100, 100', 100" are thus joined and are side by side, the joining members 108 and receivers 110 collectively prevent the tiles 100, 100', 100" from being pulled apart in a lateral direction that is substantially parallel with the ground or support surface on which the tiles 100, 100', 100" are placed. However, while the joining members 108 and receivers 110 restrict movement of the tiles 100, 100', 100" in the lateral direction, they are not tightly interlocked. Even when joined, there exists a gap 210 between adjacent tiles 100, 100', 100", as best depicted in FIG. 16. This gap 210 allows for thermal expansion and contraction of the tiles 100, 100', 100" when in use. Although shown from a second surface 132 of the tiles, it should be appreciated that the gap 210 exists and may be viewable from the first surface 102, 102', 102" of the tiles 100, 100', 100" as well.

Once the tiles 100, 100', 100" are positioned adjacent to one another and joining members 108 are retained within corresponding joining receivers 110, the fasteners 120 of the tiles 100, 100', 100" may be moved from an unlocked position 120a to a locked position 120b. Notably, the fasteners 120 do not require tools to lock and unlock but can be done easily by turning the actuating surface 122 of the fastener 120 at the first surface 102, as shown in FIG. 15 and described above. As the actuating surface 122 moves, such as rotates, the tab 128 similarly moves or rotates from within the tile 100, 100', 100" such as within the tab pocket 136, through the corresponding tab slot 114 and into the adjacent receiving slot 116 and receiving pocket 138 of the adjacent tile 100, 100', 100", as shown in FIG. 16. When locked, the tab 128 from one tile 100, 100', 100" extends into the receiving slot 116 of the adjacent tile 100, 100', 100". The tab 128 within the receiving slot 116 and/or pocket 138 of an adjacent tile 100, 100', 100" restricts movement of the tiles 100, 100', 100" in the vertical direction, transverse to the ground or surface on which the tiles 100, 100', 100" are positioned. This interaction will keep the tiles 100, 100', 100" locked together despite traffic moving along the flooring system 200 and does not interfere with the gap 210 or the ability of the tiles to expand and contract as needed. Each tile 100, 100', 100" preferably includes both fasteners 120 with tabs 128 and receiving slots 116 and/or pockets 138, and therefore both extends and receives tabs 128 for securing to adjacent tiles 100, 100', 100". This enables the tiles 100, 100', 100" to be used in any combination or arrangement as desired. When disassembly of the flooring system 200 is desired, the fasteners are simply unlocked by activating the actuating surface 122 and moving the fasteners 120 from a locked position 120b to unlocked position 120a, such as by turning or rotating the fastener 120. Once all fasteners 120 are unlocked on adjacent tiles 100, 100', 100", the tiles 100, 100', 100" may be lifted away from one another and transported and/or stored for future use.

Since many modifications, variations and changes in detail can be made to the described preferred embodiments, it is intended that all matters in the foregoing description and shown in the accompanying drawings be interpreted as illustrative and not in a limiting sense. Thus, the scope of the invention should be determined by the appended claims and their legal equivalents. Now that the invention has been described,

What is claimed is:
1. A modular floor tile comprising:
a first surface and an opposite second surface;

at least one perimetric side extending between said first and second surfaces, said at least one perimetric side defining a height of said modular floor tile;

a plurality of primary walls extending between said first and second surfaces and having a height substantially the same as said height of said modular floor tile, said plurality of primary walls configured to support said first surface;

a plurality of secondary walls extending from said first surface and between at least two of said primary walls, said plurality of secondary walls configured to support said primary walls, and said secondary walls having a height less than said height of said primary support walls; and at least one of:

(a) at least one cable channel extending within said modular floor tile from said at least one side, said at least one cable channel configured to receive and retain at least one cable therein and a cover including at least one opening extending therethrough and configured to receive said at least one cable, said cover selectively removable from said first surface and configured to be positioned in spaced apart and covering relation to said at least one cable channel, and (b) a tab slot extending through said at least one side and configured to permit passage of a fastener therethrough, a receiving slot extending through said at least one side and configured to receive said fastener of said adjacent floor tile; said fastener selectively positionable between, (i) an unlocked position and (ii) a locked position where said fastener projects through said tab slot and into said receiving slot of said adjacent floor tile said fastener configured to restrict vertical movement of said floor tile when in said locked position.

2. The modular floor tile as recited in claim 1, wherein said height of said secondary walls is half of said height of said primary walls.

3. The modular floor tile as recited in claim 1, wherein said modular floor tile has a load capacity of up to 500 psi.

4. The modular floor tile as recited in claim 1, wherein said fastener includes an actuating surface at said first surface, said actuating surface configured to be engaged to selectively move said fastener between said unlocked position and said locked position.

5. The modular floor tile as recited in claim 1, wherein said fastener is rotatable to selectively move between said unlocked position and said locked position.

6. The modular floor tile as recited in claim 1, wherein said fastener includes a tab extending outwardly therefrom, said tab configured to project through said tab slot and into said receiving slot of said adjacent floor tile in said locked position.

7. The modular floor tile as recited in claim 1, further comprising at least one tab pocket formed in said floor tile in communication with said tab slot, said at least one tab pocket configured to retain at least a portion of said fastener therein in said unlocked position.

8. The modular floor tile as recited in claim 1, further comprising at least one receiving pocket formed in said floor tile in communication with said receiving slot, said at least one receiving pocket configured to receive and retain at least a portion of said fastener from said adjacent floor tile therein in said locked position.

9. The modular floor tile as recited in claim 1, further comprising an incline portion where said height of said modular floor tile varies between said first surface and said second surface.

10. A modular floor system comprising a plurality of modular floor tiles as recited in claim 1.

11. The modular floor tile as recited in claim 1, wherein said primary walls intersect to form a grid having a plurality of vertices.

12. The modular floor tile as recited in claim 11, wherein said primary walls intersect one another at right angles.

13. The modular floor tile as recited in claim 11, wherein at least one of said secondary walls has a non-linear shape connecting to and supporting at least one side of at least one of said vertices of said primary walls.

14. The modular floor tile as recited in claim 11, wherein at least a portion of said secondary walls intersect one another.

15. The modular floor tile as recited in claim 1, wherein said at least some of said secondary walls have a non-linear shape each being at least one of curved, circular and semi-circular.

16. The modular floor tile as recited in claim 15, wherein at least a portion of said secondary walls are linear.

17. The modular floor tile as recited in claim 1, wherein said at least one side further comprises at least one of: (i) a joining member and (ii) a joining receiver, wherein said joining member is configured to engage a corresponding said joining receiver of an adjacent tile.

18. The modular floor tile as recited in claim 17, wherein said at least one side includes a joining member and a joining receiver.

19. The modular floor tile as recited in claim 17, wherein said joining member extends from said at least one side and said joining receiver is recessed in said at least one side, and said joining receiver is dimensioned to receive and restrain a corresponding said joining member of an adjacent tile.

20. The modular floor tile as recited in claim 19, wherein said joining member and said joining receiver are configured to be partially spaced apart from one another when said joining member is received and restrained in said joining receiver.

21. The modular floor tile as recited in claim 1, wherein said first surface includes at least one frictional element configured to improve traction on said first surface.

22. The modular floor tile as recited in claim 21, further comprising a plurality of frictional elements extending from said first surface, wherein at least one of said frictional elements extends further from said first surface than others of said frictional elements.

23. The modular floor tile as recited in claim 1, further comprising at least one cable channel extending within said modular floor tile and from said at least one side, said at least one cable channel configured to receive and retain at least one cable therein.

24. The modular floor tile as recited in claim 23, wherein said modular floor tile includes a plurality of sides, said at least one cable channel extending between different ones of said plurality of sides.

25. The modular floor tile as recited in claim 23, wherein said first surface further comprises a cover selectively removable from said first surface and configured to be positioned in spaced apart and covering relation to said at least one cable channel.

26. The modular floor tile as recited in claim 1, wherein said fastener includes a bore extending therethrough from said first surface to said second surface of said modular floor tile, said bore configured to permit fluid flow therethrough.

27. The modular floor tile as recited in claim 26, wherein said fastener includes a resilient member forming a fluid-tight seal between said first surface and said second surface.

28. A modular floor tile comprising:
a first surface and an opposite second surface;
at least one perimetric side extending between said first and second surfaces, said at least one side having:
(i) at least one joining member;
(ii) at least one joining receiver configured to receive and restrain a corresponding said joining member of an adjacent floor tile to limit lateral movement of said floor tile relative to said adjacent floor tile; and
(iii) at least one of:
a. a tab slot extending through said at least one side and configured to permit passage of a fastener therethrough, and
b. a receiving slot extending through said at least one side and configured to receive a fastener of said adjacent floor tile;
said fastener selectively positionable between: (i) an unlocked position and (ii) a locked position where said fastener projects through said tab slot and into said receiving slot of said adjacent floor tile, said fastener configured to restrict vertical movement of said floor tile when in said locked position.

29. The modular floor tile as recited in claim 28, wherein said fastener includes an actuating surface at said first surface of said modular floor tile, said actuating surface configured to be selectively engaged to move said fastener between said unlocked position and said locked position.

30. The modular floor tile as recited in claim 28, wherein said fastener is rotatable to selectively move between said unlocked position and said locked position.

31. The modular floor tile as recited in claim 28, wherein said fastener includes a tab extending outwardly therefrom, said tab configured to project through said tab slot and into said receiving slot of said adjacent floor tile in said locked position.

32. The modular floor tile as recited in claim 28, further comprising at least one tab pocket formed in said second surface in communication with said tab slot, said at least one tab pocket configured to retain at least a portion of said fastener therein in said unlocked position.

33. The modular floor tile as recited in claim 28, further comprising at least one receiving pocket formed in said second surface in communication with said receiving slot, said at least one receiving pocket configured to receive and retain at least a portion of said fastener from said adjacent floor tile therein in said locked position.

34. The modular floor tile as recited in claim 28, wherein said at least one joining member and said at least one joining receiver are configured to be spaced apart from one another when said at least one joining member is received and restrained in said at least one joining receiver.

35. The modular floor tile as recited in claim 28, farther comprising an incline portion where said height of said modular floor tile varies between said first surface and said second surface.

36. A modular flooring system comprising a plurality of modular floor tiles as recited in claim 28.

37. The modular floor tile as recited in claim 28, wherein said fastener includes a bore extending therethrough from said first surface to said second surface of said modular floor tile, said bore configured to permit fluid flow therethrough.

38. The modular floor tile as recited in claim 37, wherein said fastener includes a resilient member forming a fluid-tight seal between said first surface and said second surface.

39. The modular floor tile as recited in claim 28, wherein said first surface includes at least one frictional element configured to improve traction on said first surface.

40. The modular floor tile as recited in claim 39, further comprising a plurality of frictional elements extending from said first surface, wherein at least one of said frictional elements extends further from said first surface than others of said frictional elements.

41. The modular floor tile as recited in claim 28, further comprising at least one cable channel extending within said modular floor tile and from said at least one side, said at least one cable channel configured to receive and retain at least one cable therein.

42. The modular floor tile as recited in claim 41, wherein said modular floor tile includes a plurality of sides, said at least one cable channel extending between different ones of said plurality of sides.

43. The modular floor tile as recited in claim 41, wherein said first surface further comprises a cover selectively removable from said first surface and configured to be positioned in spaced apart and covering relation to said at least one cable channel.

44. The modular floor tile as recited in claim 43, wherein said cover includes at least one opening extending therethrough and configured to receive said at least one cable.

45. A method of assembling a modular flooring system, comprising:
obtaining at least first and second modular floor tiles each having:
(i) at least one joining member;
(ii) at least one joining receiver configured to configured to receive and restrain a corresponding said joining member of an adjacent floor tile; and
(iii) at least one fastener selectively positionable between an unlocked position and a locked position;
positioning said first modular floor tile on a support surface;
positioning said second modular floor tile adjacent to said first modular floor tile such that said at least one joining member of said first modular floor tile is received and restrained within a corresponding one of said at least one joining receiver of said second modular floor tile so as to restrict lateral movement of said first and second modular floor tiles relative to one another; and
selectively moving said at least one fastener from said unlocked position to said locked position where said fastener projects from said first modular floor tile and into said second modular floor tile to restrict vertical movement of said first and second modular floor tiles relative to one another.

46. The method as recited in claim 45, further comprising leaving a gap between said first and second modular floor tiles when joined.

47. The method as recited in claim 45, wherein selectively moving said at least one fastener further comprises rotating said at least one fastener.

48. The method as recited in claim 45, wherein selectively moving said at least one fastener further comprises engaging an actuating surface on said at least one fastener.

49. The method as recited in claim 48, wherein selectively moving said at least one fastener is performed in a tool-less manner.

* * * * *